United States Patent
Negri

(10) Patent No.: US 10,527,300 B2
(45) Date of Patent: Jan. 7, 2020

(54) SYSTEM FOR COOLING MOTOR VEHICLES AND BUILDING METHOD THEREOF

(71) Applicant: Ernesto Biroli, Corsico (IT)

(72) Inventor: Maurizio Negri, Corsico (IT)

(73) Assignee: Maurizio Negri, Corsico (MI) (IT)

( * ) Notice: Subject to any disclaimer, the term of this patent is extended or adjusted under 35 U.S.C. 154(b) by 454 days.

(21) Appl. No.: 15/125,984

(22) PCT Filed: Apr. 21, 2016

(86) PCT No.: PCT/EP2016/058898
§ 371 (c)(1),
(2) Date: Sep. 14, 2016

(87) PCT Pub. No.: WO2017/021020
PCT Pub. Date: Feb. 9, 2017

(65) Prior Publication Data
US 2018/0172293 A1    Jun. 21, 2018

(30) Foreign Application Priority Data

Jul. 31, 2015 (IT) .................. 202015000040036
Jan. 21, 2016 (IT) .................. 102016000005305

(51) Int. Cl.
*F24F 5/00* (2006.01)
*F24F 6/14* (2006.01)
(Continued)

(52) U.S. Cl.
CPC .......... *F24F 5/0035* (2013.01); *B05B 1/3006* (2013.01); *B60H 1/00207* (2013.01);
(Continued)

(58) Field of Classification Search
CPC ......... B05B 1/3006; F24F 5/0035; F24F 6/14; F24F 2006/146; B60H 2001/3289; B60H 1/00207; B60H 1/3202; Y02B 30/545
See application file for complete search history.

(56) References Cited

U.S. PATENT DOCUMENTS 5,266,123 A * 11/1993 Brand ................. B60S 3/04
134/100.1
5,669,981 A * 9/1997 Stinnett ................ B60S 3/04
134/123

(Continued)

FOREIGN PATENT DOCUMENTS

| CA | 2692900 A1 | 8/2011 |
| EP | 2402670 A1 | 1/2012 |
| WO | 03036205 A1 | 5/2003 |

OTHER PUBLICATIONS

International Search Report and Written Opinion for International Application No. PCT/EP2016/058898 (dated Aug. 17, 2016) (10 pages).

*Primary Examiner* — Benjamin L Osterhout
(74) *Attorney, Agent, or Firm* — Lucas & Mercanti, LLP

(57) ABSTRACT

A system for cooling motor vehicles, having a covering subsystem having a shelter and a plurality of side walls being configured to accommodate a motor vehicle is provided. The system also has a nebulization subsystem fastened to an internal side wall of the shelter and has a plurality of nozzles configured to spray inside the covering subsystem microscopic droplets of water, the microscopic droplets of water being suitable to evaporate and realize an adiabatic transformation arranged to lower the temperature inside the covering subsystem. The invention also relates a method to realize the system for cooling motor vehicles.

15 Claims, 4 Drawing Sheets

(51) Int. Cl.
*B05B 1/30* (2006.01)
*B60H 1/32* (2006.01)
*B60H 1/00* (2006.01)

(52) U.S. Cl.
CPC .............. *B60H 1/3202* (2013.01); *F24F 6/14* (2013.01); *B60H 2001/3289* (2013.01); *F24F 2006/146* (2013.01); *Y02B 30/545* (2013.01)

(56) References Cited

U.S. PATENT DOCUMENTS

| | | | | |
|---|---|---|---|---|
| 6,000,631 | A * | 12/1999 | Lamminen | B60S 3/04 134/123 |
| 2006/0065292 | A1* | 3/2006 | Moore | B60S 3/04 134/26 |
| 2008/0185019 | A1* | 8/2008 | Hodge | B08B 3/024 134/18 |
| 2009/0065604 | A1 | 3/2009 | De La Puente | |
| 2011/0197922 | A1* | 8/2011 | Turner | B60S 3/04 134/18 |

\* cited by examiner

SYSTEM FOR COOLING MOTOR VEHICLES AND BUILDING METHOD THEREOF

CROSS-REFERENCE TO RELATED APPLICATIONS

This application is a 371 of PCT/EP2016/058898 filed Apr. 21, 2016, which claims the benefit of Italian Application Numbers 202015000040036 filed Jul. 31, 2015 and 102016000005305 filed Jan. 21, 2016.

TECHNICAL FIELD

The present invention relates, in general, to a system for cooling motor vehicles. In particular, the present invention relates to a system being configured to control internal climatic conditions of passenger compartments of vehicles.

BACKGROUND ART

It is known, from daily experience, that the passenger compartment of a vehicle, which is kept exposed to sunrays, tends to overheat.

As a matter of fact, when we want to restart the car, after we have left it under the sunrays, even for a short time, in order to avoid a sudden illness, we have to leave the car with the doors open and the air conditioner on, waiting that the internal climatic conditions of the passenger compartment become acceptable.

In this way we introduce some negativities:
we lose time;
we waste energy by burning fuel;
we increase pollution;
we use thermal conditioning devices with very adverse operating points.

For example, it is known, on the basis on what was published on the website www.ecoseven.net/ of the company Ecomedianet S.r.l. on Jun. 10, 2014:

"An American study has demonstrated that the sun can dangerously overheat the passenger compartment of a vehicle in only 30 minutes, even if the air temperature is relatively fresh. On days when it's not too hot, the internal temperature of a vehicle, which is left under the sunrays, can increase also to 22° in one hour, while in summer, it would be enough only 15 minutes to have the passenger compartment of a vehicle at a temperature nearest to 65°."

As it is known, this phenomenon of overheating depends from the energy received by the vehicle and that is no longer dissipated.

In fact, as stated on Jul. 27, 2015 on the web site http://www.meteosolutions.com/3bmeteo.php of the company Meteosolutions S.r.l.: "Under the sun, the internal temperature of a closed car can quickly increase. The solar energy with short-wave lights enters into vehicles through the glasses. The objects into the car heat up and generate long-waves energy. However, this type of energy is not able to go out from the vehicle!!".

In general, the applicant has noted that, due to the overheating of the passenger compartment of a car under the sunrays, there is the problem that the same car cannot be immediately used with the consequent loss of time and loss of energy for the use of thermal conditioning devices of the car with very adverse operating point.

DISCLOSURE OF THE INVENTION

The object of the present invention is to solve the above reported technical problem.

The protection system for motor vehicles as claimed achieves the object.

The present invention relates also to a method of building the protection system according to the present invention.

The claims are an integrated part of the technical teaching here provided, regarding the invention.

The following synthetic description of the invention is given in order to give a basic understanding of some aspects of the invention.

This synthetic description is not a detailed description and as such, it should not be understood to identify key or critical elements of the invention or to outline the aim of the invention. The only aim is to present some concepts of the invention in a simplified form as an anticipation to the detailed description reported below.

According to a characteristic of a preferred embodiment of present invention, the system comprises a covering subsystem being configured to accommodate a motor vehicle and a nebulization subsystem configured to spray inside the covering water in form of microscopic droplets in order to realize an adiabatic transformation with lowering of the temperature inside the covering.

According to a further characteristic of the present invention, the system further comprises a coin box configured to enable the use of the subsystems and the components of the system following the introduction of a determined number of coins.

According to another characteristic of the present invention, the system comprises a photovoltaic subsystem to electrically power the subsystems and the components that are present in the system.

BRIEF DESCRIPTION OF DRAWINGS

These and further features and advantages of the present invention will appear more clearly from the following detailed description of a preferred embodiment, provided by way of non-limiting example with reference to the attached drawings, in which components designated by same or similar reference numerals indicate components having same or similar functionality and construction and wherein.

BEST MODE FOR CARRYING OUT THE INVENTION

Figure 1:
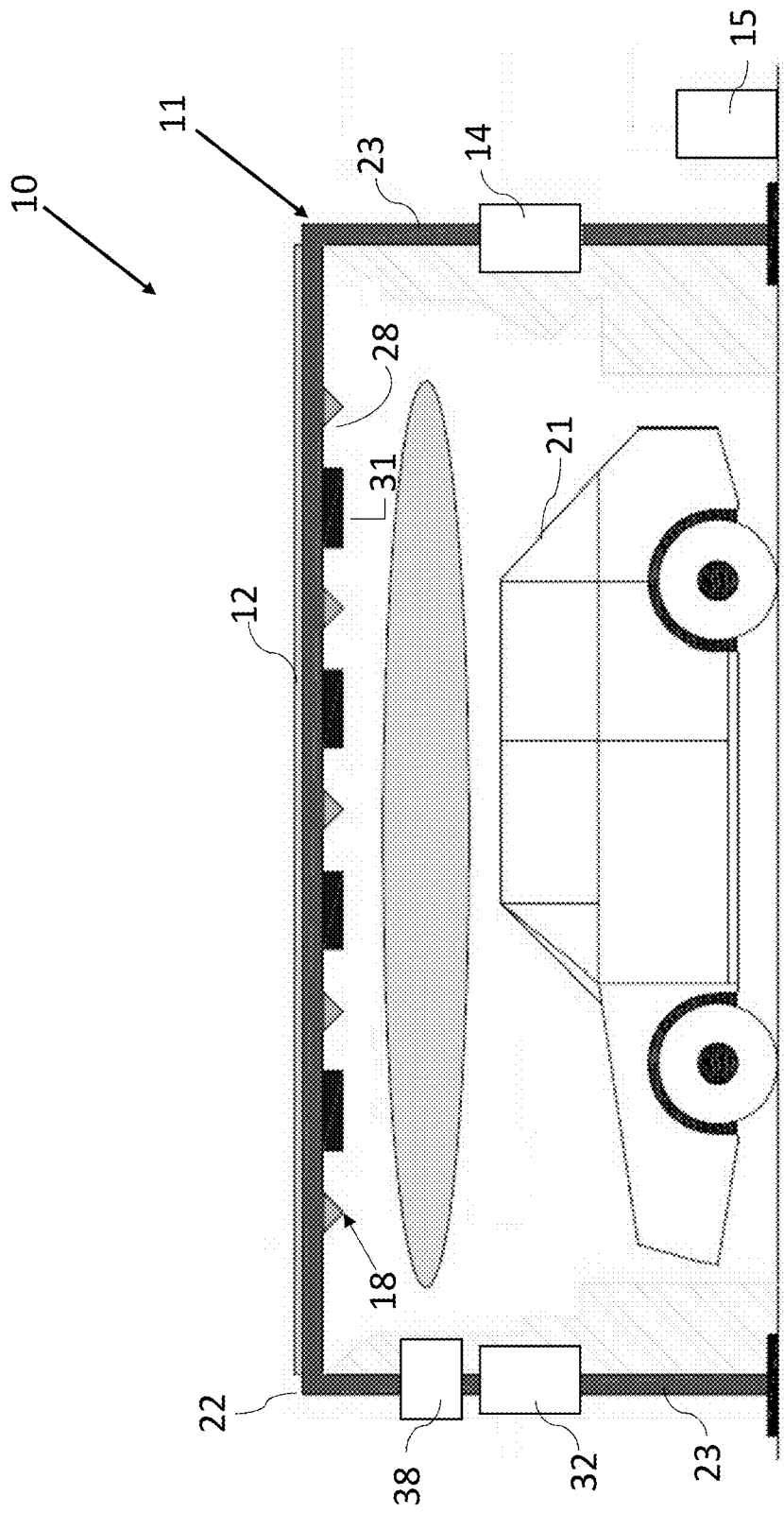
FIG. 1 schematically represents a system according to the invention.
Figure 2:
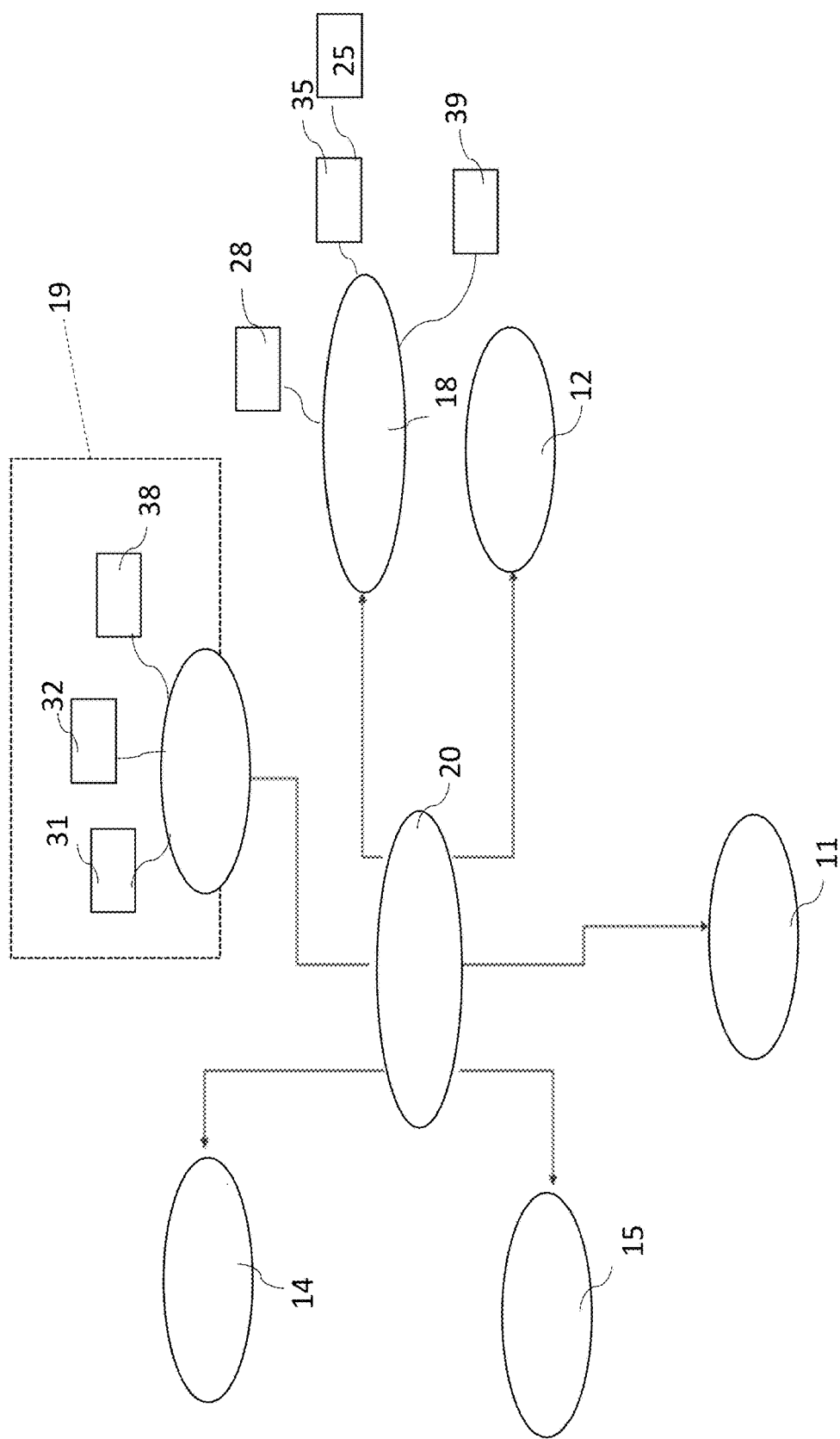
FIG. 2 represents a general block diagram of the system of FIG. 1.

With reference to the FIG. 1 a system for cooling motor vehicles (cooling system or system) 10 according to the present invention comprises:

a covering subsystem (covering) 11 configured to repair form the sunrays at least a motor vehicle 21, for example a car, placed inside the covering; the covering 11, preferably, it has also the function of an anchoring structure for other subsystems of the system 10;

a photovoltaic subsystem 12, for example at least a photovoltaic panel, preferably externally fixed, as commonly known, to an upper wall (shelter) 22 of the covering and configured to ensure the supply of energy at a low voltage to the devices of the system 10 and to keep a pack of batteries 26 provided in the system 10 in a charged state, for example for safety-related functions;

a coin box subsystem (coin box) 14 fixed, for example, to a side wall of the covering and configured to allow the use of the cooling system 10; the coin box, for example, can work with tokens or coins;

In a preferred embodiment, the coin box 14 work with coins as such type of functioning does not require also the implementation of a device for the change from coins to tokens;

a bollard system (bollard) 15 configured to prevent the use of the system 10 unless the necessary coins in the coin box 14 have been inserted. The bollard 15, preferably, is realized through a device that, once it is turned off, allow both the entrance and the exit of the car 21 from the covering 11:

a nebulization subsystem (nebulizator) 18 fixed, preferably, in the shelter of the covering and configured to receive water from a source or from a water power supply 35 and for watering it with a suitable pressure and flux, after the opening of a delivery electrovalve 29, on the car 21 through nebulization devices (nozzles or nebulizers) 28 to refresh it, as it will be further described in details.

The system, according to a preferred embodiment further comprises a central control unit 20, fixed, for example to a side wall of the covering and configured to control both the subsystems comprised in the system 10, above reported, and the service subsystems 19, configured in general to ensure the safety and the maintenance of the system.

The services 19, comprise for example, the following components:

one or more service lamps 31, for example crepuscular lamps preferably fixed in the shelter 22 of the covering 11 to ensure the lighting of the internal parts of the covering 11;

an electric panel or various switches 32 fixed to a side wall 23 of the covering 11 and configured to detect electric power lines to the central control unit 20 of the system 10;

a possible water supply pump fixed to the nebulization system if the on site water pressure is not enough to allow the functioning of the system; in fact for the proper functioning of the nebulizer it is expected to be requested a pressure at least higher than 3 bar;

at least a valve 34 placed inside or outside the covering and configured to detect the water power supply 35;

a telephone dialer 38 placed inside or outside the covering and configured for example to give alarms to a telephone exchange.

Of each subsystems are here below described some details to better clarify some architectural and functional aspects of the system 10 according to the present invention.

The covering 11 is the subsystem arranged to contain, when in use, the car 21 and comprises the shelter 22 and preferably four panels or side walls 23 three of which are preferably closed.

The shelter 22, is preferably realized with a filter material, for example PVC or solar protection films. The filter material can be omitted in the event that photovoltaic panels along all the shelter 22 are installed to prevent so the entrance of sun rays in the covering 11.

The side walls 23 are useful to delimit the space in which the cooling is carried out and to filter the heat. Preferably, it is provided that a fourth side wall of the covering 11 is open to ensure the entrance and the exit of the car without the need of an entrance/exit doorway.

The covering 11, is preferably built by way of a reticular structure comprising, for example, wood poles, treated in known way to prevent moss formation, or aluminum.

The covering, is preferably resistant to atmospheric conditions such for example to wind, water and/or snow.

According to a preferred embodiment, the poles of the side walls 23 include bases fixed on the ground in a known way, in order to avoid, preferably, the arrangement of sealing plinths.

Preferably, to the shelter 22 and to the side walls 23 of the covering 11 are fixed all the subsystems and components provided for the functioning of the system 10.

The photovoltaic subsystem (panel) 12 is preferably provided to produce and to store electricity to power the subsystems and the electrical components (electrical devices) of the system 10.

The choice to preferably provide a photovoltaic subsystem 12 to power the electrical devices of the system 10 is due to the fact that the system 10 is planned to cool cars when the sun rays overheat the same cars.

Preferably, when in use, during the sunlight it will be directly use the electricity that comes from the panel 12, whether during the rest of the day it will be use the electricity that comes from the pack of batteries 26 to power the electrical devices of the system 10.

According to other forms of embodiment the photovoltaic subsystem 12 cannot be present and the electricity can be provided to system 10 directly from external sources.

Figure 3:
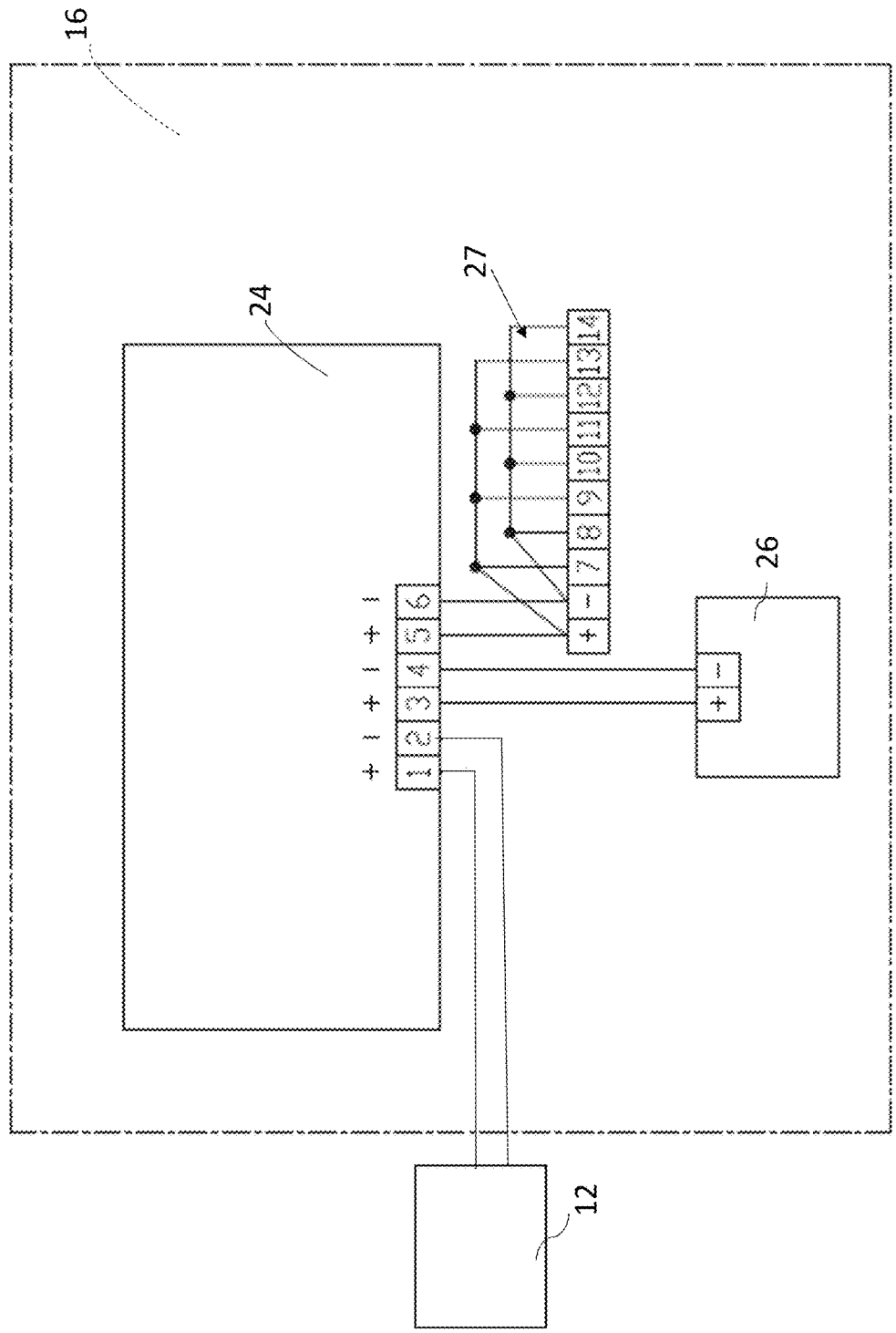
FIG. 3 schematically represents a first detail of the system according to the invention.

According to a preferred embodiment, in particular, the panel 12 is configured to provide electricity to:

a coin box 14;
a telephone dialer 38, for example a GSM type;
a bollard system 15;
service lamps 31;
a possible supply pump to the nebulization system;

According to a preferred embodiment, the photovoltaic panel 12 is also electrically connected to devices included in a box 16 (FIGS. 1 and 3), for example a containment box suitable for external uses, in which are installed, for example:

a voltage regulator 25;
a pack of batteries 26;
a terminal for the output to users 27;
connected all together in a known way.

Preferably, the containment box 16 comprises, in order to spread electricity, tubes realized, for example, with heavy PVC and with fittings for external use.

In a preferred embodiment, it is planned a coin box 14 which is configured to allow a client to use the system 10.

Figure 4:
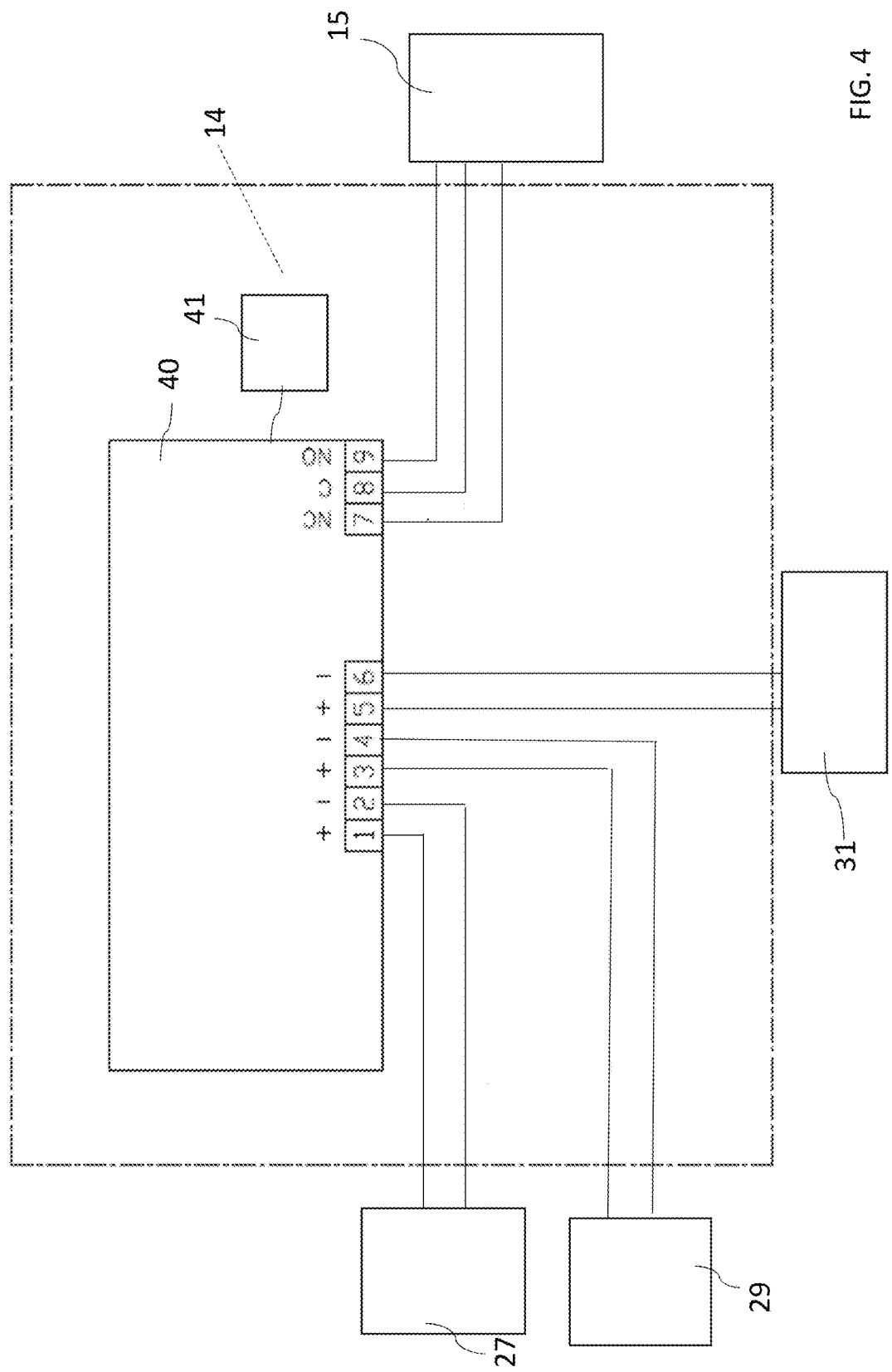
FIG. 4 schematically represents a second detail of the system according to the invention.

The coin box, preferably, comprises a coin acceptor 41 (FIG. 1, FIG. 4) connected to an electronic control unit (electronic coin box) 40.

The coin box 14 is configured to enable and disable one or more of the following subsystems and/or components:

service lamps 31;
bollard system 15;
delivery electrovalve (electrovalve) 29.

In particular, when in use, once the coins are inserted in a correct amount in the coin box 14, the bollard system 15 will be disable for the entrance of the car 21 inside the covering 11 and a counter that allows the activation of the nebulization inside the covering through the open of the electrovalve 29 is activated.

The nebulization will be preferably activated within a time limit in order to allow the client to go outside from the covering before the nebulizer 18 is put into operation. According to other forms of embodiment, that are considered less preferable, it is also provided:

- a payment with tokens which requires the presence of a device for the change from coins to tokens;
- a manual button for the activation of supply that requires however a particular attention for the client.

When in use, the bollard system will be restored at the end of the service once the car is removed.

Preferably, the removal of the car will be recognized through a known type of photocellular device or similar.

Preferably, the coin box is powered at 12 Volt cc and it is fixed to a side wall 23 of the covering 11, for example the side wall corresponding to an access line of the car 21 to the covering 11.

More preferably, the coin box includes devices that make it waterproof from weather conditions.

More preferably, the coin box includes:

- a box, for example made of stainless steel, to resist to difficult climatic conditions;
- an opening, for example with seals
- a lock for the opening of the box, for example waterproof.

In a preferred embodiment it is provided a bollard system 15 that prevents the parking of the car under the covering 11 before inserting a correct amount of coins into the coin acceptor 41 of the coin box 14.

In a preferred embodiment the bollard system, is placed on the surface, as it does not require the placement of a containment capsule underground.

Preferably, is provided an electric drive from the coin box that activate a starter at low tension and absorption being configured to deactivate the bollard system 15. When in use, once the car is removed from the covering, the photocellular device or similar, allows the restoration of the access lock to the covering 11.

The nebulizator 18, according to a preferred embodiment of the present invention is configured to obtain a real cooling of the car.

The nebulizator, comprises preferably three parts and more precisely:

- a connection 25 to hydraulically power the system:
- a tube network 39
- a plurality of nozzles or nebulizers 28.

The connection 25 is configured to supply water to the system 10.

Preferably, it is provided that the water is picked up on site through the connection 25 to an external supply system and it is distributed inside the covering through the electrovalve 29 and the tube network 39.

The connection, has preferably also a manual valve for the closure of the water supply, in case of need.

The tube network 39 comprises, preferably, one or more tubes starting from the electrovalve 29 and they spread water to the nozzles 28.

Preferably, the tube network 29 is realized with one of the following material:

- copper;
- steel;
- plastic.

According to other embodiments the tube network is realized with different materials from those indicated without being for this outside the field of what it is described and claimed.

In the exemplary embodiment here described it is provided the use of a black plastic material which can be used, for example, at a range temperature comprises among −20° C. and +80° C. and a maximum pressure at about 80 bar. The installation of the tube network, in case of plastic tubes, can be effected through the use of a good shear to allow a precise cut of the tubes, which are preferably fixed to the connections and the nozzles holder for example, a quick connection.

The nozzles, according to a preferred embodiment of the present invention, are configured to allow the formation of microscopic droplets of water whose evaporation causes the lowering of the temperature.

In particular the nozzles transform the total energy of a liquid flow in kinetic energy. The kinetic energy is used to break the liquid flow in micro droplets to evenly disperse according to the desired section. The nozzles moreover allow to obtain predetermined flows according to the pressure.

Providing that, according to a preferred embodiment, are nebulizers 28 with a wide-flow angle with a suitable tip with nozzles for frog, for example nebulizers with nozzles for frog of the company Spraying System Co, it is possible to obtain a flow of 3.9 liters/hour with a flow angle at 80°.

According to the exemplary embodiment here provided, once the micro droplets are formed, the cooling process due to evaporation of water can start.

The thermodynamic process that is at the base of the lowering of the temperature is the generation of an adiabatic transformation inside the covering with the consequent lowering of the temperature.

In particular, the adiabatic transformation implies that the total energy inside the covering does not change but is transformed following the evaporation of the water thanks to a physical phenomenon wherein part of the energy, which is inside the covering in the form of heat (said latent heat of vaporization) is used to pass by evaporation the nebulized water in the form of gas.

The result of the transformation is the lowering of the temperature inside the covering.

The speed of evaporation is inversely proportional to the diameter of the drop according to the following formula that expresses the heat exchange surface according to the droplet diameter, per unit of volume:

$$\frac{A}{V} = \frac{3}{r}$$

wherein:

A is the surface of a nebulized droplet;
V is the volume of a nebulized droplet;
R is the radius of a nebulized droplet.

It follows that by reducing even a little the diameter r the surface increases a lot, above all when the diameter of the drop becomes very small as in the nebulization process.

If we consider for example, a fog with a medium radius of 10 μm, the volume and the surface of a droplet is of:

$$V = \frac{4}{3}\pi r^3 = \frac{4}{3}\pi 0.0001^2 = 4,188 \cdot 10^{-16} \text{ m}^3$$

Thus to atomize 1 liters of water in droplets with a radius of 10 μm are needed:

$$n - \frac{1}{1000V}$$

namely more than 238 billion of drops which correspond to almost 300 m² of heat exchange surface, that leads the vaporization process extremely fast (the said flash vaporization).

The nebulization process is made by friction with the air. For this purpose, it is very important the speed in which the water comes into contact with the air. This speed is reached with the passage through the microscopic holes of the atomizer nozzles for fog.

According to the present exemplary embodiment, the number of nebulizers 28 with nozzles for fog is, for example, comprised among 4 and 20 with a uniform distribution inside the covering 11.

According to various form of embodiment described it is provided that suitable sensors placed inside the covering 11 are configured to activate a correct number of nebulizers 28, for example comprised among 4 and 20, according to the size characteristics of the car.

In summary, each nebulizer 28 of the nebulization subsystem 18 emits a cone of nebulized water that extracts heat from the car by reducing the current temperature.

The functioning of the system so far described is the following.

In a first phase the costumer, who has the desire to keep cool the passenger compartment of his own car, will approach to the bollard system 15 and will insert in the coin box 14 of the system 10 an enough amount of coins to ensure that the passenger compartment of the car 21 is kept cool for a predetermined period of time.

In a second phase, following the insertion of the coins in the coin acceptor 41, the electronic part of the coin box 40 will switch on the lamps 31 and after a predetermined period of time to let the electrovalve 29 open to start the nebulization of the water with the nebulizer 18.

The nebulization of water will be such to maintain the car 21 and the passenger compartment cooled until the costumer will pull the car out.

In a third phase the client will pull the car out. The extraction of the car will be detected by the photo cellular device or similar that will order to the central control unit 20 to reactivate the bollard system (15), to stop the nebulizator 18 and to switch off the lamps 31 waiting for a new costumer.

Advantageously, the described system comprises in its structure and it uses for its functioning eco-friendly subsystems and components.

Advantageously, the described system allows to maintain the passenger compartment of the car, for predetermined periods at such temperatures for which it is immediately usable from the costumer.

Advantageously, the temperature of the passenger compartment will be kept at such levels to allow the presence of peoples or animals inside it, for example in case of short stops.

Advantageously, the temperature of the passenger compartment of the car, after the use of the here described system, will be such to avoid alterations and textile or leather damages in the car.

Advantageously, the covering subsystem and the bollard subsystem, as described according to a preferred embodiment, do not require plinths or excavations, the cooling system can be therefore easily installed in any area in which are provided connections for receiving water from a source or from a water supply circuit.

Naturally, obvious modifications and/or variations are possible to the above description, shapes, materials, components, circuital elements and connections as well as in the details of the illustrated construction and in the operating method without deviating from the invention as it is specified in the following claims.

The invention claimed is:

1. A system for cooling motor vehicles, comprising:
   a covering subsystem comprising a shelter and a plurality of side walls, said covering subsystem being configured to accommodate a motor vehicle;
   a nebulization subsystem fastened to an internal side of said shelter and comprising a plurality of nozzles configured to spray inside said covering subsystem microscopic droplets of water, said microscopic droplets of water being suitable to evaporate and realize an adiabatic transformation arranged to lower temperature inside said covering subsystem;
   wherein said system further comprises
   a coin box subsystem fastened to one of the walls of the covering subsystem;
   a bollard subsystem configured to prevent access of the motor vehicle inside said covering sub system,
   an electromagnetic valve configured to activate water spraying within the covering subsystem by way of said nozzles,
   said coin box subsystem being electrically connected to said bollard subsystem and to said electromagnetic valve and being configured to disable said bollard subsystem and to activate water spraying inside said cover by activating the opening of said electromagnetic valve following the insertion of a certain number of coins.

2. The system according to claim 1, wherein
   said plurality of nozzles are arranged to be selectively activated according to the longitudinal size of the motor vehicle whereby, in use, first nozzles are located next to the front part, other nozzles next to the central part, and still others nozzles next to the rear part of the motor vehicle when said motor vehicle is housed inside the covering subsystem.

3. The system according to claim 2, wherein said coin box subsystem, said bollard subsystem and said electromagnetic valve are electrically powered by a photovoltaic subsystem fastened to an external side of said shelter.

4. The system according to claim 2, wherein said covering subsystem is made of a reticular framework without plinths or excavations and comprises piles made of materials selected from the group consisting of:
   wood processed so as to avoid moss formation on it, and aluminum.

5. The system according to claim 1, wherein said coin box subsystem, said bollard subsystem and said electromagnetic valve are electrically powered by a photovoltaic subsystem fastened to an external side of said shelter.

6. The system according to claim 5, wherein said covering subsystem is made of a reticular framework without plinths or excavations and comprises piles made of materials selected from the group consisting of:
   wood processed so as to avoid moss formation on it, and aluminum.

7. The system according to claim 1, wherein said covering subsystem is made of a reticular framework without plinths or excavations and comprises piles made of materials selected from the group consisting of:
   wood processed so as to avoid moss formation on it; and aluminum.

8. The system according to claim 1, further comprising:
   a tube network arranged to feed said nebulization subsystem by water collected from an external feeding system, said tube network being made of materials selected among the group consisting of copper,
steel, and
plastic.

9. A method of building a system for cooling motor vehicles, comprising the steps of:
providing a covering subsystem arranged to accommodate a motor vehicle; and
providing a nebulization subsystem inside said covering subsystem arranged to put into operation the steps of:
spraying microscopic droplets of water inside said covering subsystem by way of a plurality of nozzles,
selectively activating said plurality of nozzles according to the longitudinal size of the motor vehicle whereby, in use, first nozzles are selectively activated next to a front part, other nozzles next to a central part, and still others nozzles next to a rear part of the motor vehicle when said motor vehicle is housed inside the covering subsystem; and
realizing an adiabatic transformation arranged to lower temperature inside said covering subsystem by way of an evaporation of said microscopic droplets of water inside said covering subsystem.

10. The method according to claim 9, further comprising the steps of:
providing a bollard subsystem configured to prevent access of the motor vehicle inside said covering subsystem;
providing an electromagnetic valve configured to activate the water spray and the adiabatic transformation; and
providing a coin box subsystem being configured to disable said bollard subsystem and to activate the spraying step and the realization of the adiabatic transformation following the insertion of a certain number of coins into the coin box subsystem.

11. The method according to claim 10, further comprising the step of:
providing a photovoltaic subsystem arranged to electrically power said coin box subsystem, said bollard subsystem and said electromagnetic valve.

12. The method according to claim 9, further comprising the step of:
providing a tube network arranged to feed said nebulization subsystem by water collected from an external feeding system.

13. A system for cooling motor vehicles, comprising:
a covering subsystem comprising a shelter and a plurality of side walls, said covering subsystem being configured to accommodate a motor vehicle; and
a nebulization subsystem fastened to an internal side of said shelter and comprising a plurality of nozzles configured to spray inside said covering subsystem microscopic droplets of water, said microscopic droplets of water being suitable to evaporate and realize an adiabatic transformation arranged to lower temperature inside said covering subsystem;
wherein
said plurality of nozzles are arranged to be selectively activated according to the longitudinal size of the motor vehicle whereby, in use, first nozzles are located next to a front part, other nozzles next to a central part, and still others nozzles next to a rear part of the motor vehicle when said motor vehicle is housed inside the covering subsystem.

14. The system according to claim 13, wherein said covering subsystem is made of a reticular framework without plinths or excavations and comprises piles made of materials selected from the group consisting of:
wood processed so as to avoid moss formation on it, and
aluminum.

15. The system according to claim 13, further comprising:
a tube network arranged to feed said nebulization subsystem by water collected from an external feeding system, said tube network being made of materials selected from the group consisting of:
copper,
steel, and
plastic.

* * * * *